United States Patent

Kondo et al.

[11] Patent Number: 5,321,073
[45] Date of Patent: Jun. 14, 1994

[54] RUBBER COMPOSITION

[75] Inventors: Takeo Kondo; Jiro Miyagawa; Katsuaki Shinohara, all of Machida, Japan

[73] Assignee: Denki Kagaku Kogyo Kabushiki Kaisha, Tokyo, Japan

[21] Appl. No.: 870,214

[22] Filed: Apr. 17, 1992

Related U.S. Application Data

[63] Continuation of Ser. No. 234,527, Aug. 22, 1988, abandoned.

[30] Foreign Application Priority Data

Aug. 24, 1987 [JP] Japan .................. 62-209697

[51] Int. Cl.$^5$ .............................. C08L 27/00
[52] U.S. Cl. ..................... 524/520; 524/521; 524/523; 525/199; 525/194
[58] Field of Search ........... 525/199, 194; 524/520, 524/521, 523

[56] References Cited

U.S. PATENT DOCUMENTS

| | | | |
|---|---|---|---|
| 4,303,560 | 12/1981 | Takahashi et al. | 526/273 |
| 4,508,885 | 4/1985 | Nishiwaki et al. | 526/318 |
| 4,517,348 | 5/1985 | Takahashi et al. | 526/273 |
| 4,625,005 | 11/1986 | Miyabayashi et al. | 525/208 |
| 4,675,362 | 6/1987 | Miyabayashi et al. | 525/208 |
| 4,792,581 | 12/1988 | Kondo et al. | 524/523 |
| 4,822,654 | 4/1989 | Takemura et al. | 525/199 |

FOREIGN PATENT DOCUMENTS

| | | |
|---|---|---|
| 0194030 | 1/1985 | European Pat. Off. |
| 60-208312 | 10/1985 | Japan . |
| 61-136544 | 6/1986 | Japan . |
| 61-176652 | 8/1986 | Japan . |
| 62-051439 | 3/1987 | Japan . |
| 62-053352 | 3/1987 | Japan . |
| 62-053353 | 3/1987 | Japan . |
| 62-081433 | 4/1987 | Japan . |
| 62-116651 | 5/1987 | Japan . |
| 62-190245 | 8/1987 | Japan . |
| 62-236841 | 10/1987 | Japan . |
| 63-008447 | 1/1988 | Japan . |
| 63-039336 | 2/1988 | Japan . |

*Primary Examiner*—Melvyn I. Marquis
*Assistant Examiner*—Karen A. Dean
*Attorney, Agent, or Firm*—Oblon, Spivak, McClelland, Maier & Neustadt

[57] ABSTRACT

A rubber composition obtained by curing with a peroxide a blend comprising 100 parts by weight of an acrylic elastomer and from 20 to 100 parts by weight of a polyvinylidene fluoride resin relative to 100 parts by weight of the acrylic elastomer.

8 Claims, No Drawings

RUBBER COMPOSITION

This application is a continuation of application Ser. No. 07/234,527, filed on Aug. 22, 1988, now abandoned.

BACKGROUND OF THE INVENTION

The present invention relates to a rubber composition having excellent durability. More particularly, it relates to a rubber composition of a cured blend of an acrylic elastomer and a polyvinylidene fluoride resin.

DISCUSSION OF THE BACKGROUND

Heretofore, for rubber parts to be in contact with fuel oil, rubber material has been selected for use so that the durability will not be impaired even when it is used in contact with such oil. For example, for fuel oil hoses, it has been common to use nitrile rubber (NBR) or hydrine rubber (CO and ECO) which has good oil resistance. However, as a result of the advent of an alcohol-added gasoline (hereinafter referred to as "gasohol") under the fuel situation in recent years, there has been a problem of deterioration of rubber, particularly a problem of the volume change after immersion in gasohol. For this reason, NBR, CO and ECO are inadequate in the gasoline resistance against various gasolines, for use as fuel oil hoses. A material having improved durability has been desired.

SUMMARY OF THE INVENTION

It is an object of the present invention to provide a material having high durability, particularly improved durability against gasohol for e.g. fuel oil hoses for automobiles.

The present invention provides a rubber composition obtained by curing a blend comprising 100 parts by weight of an acrylic elastomer and from 20 to 100 parts by weight of a polyvinylidene fluoride resin with a peroxide. This composition has high durability particularly against gasohol and is useful for various applications under various severe conditions.

DETAILED DESCRIPTION OF THE PREFERRED EMBODIMENTS

The acrylic elastomer to be used for the rubber composition of the present invention is preferably an elastomer obtained by polymerizing from 80 to 100% by weight of an alkoxyalkyl acrylate, from 0 to 20% by weight of acrylonitrile, from 0 to 5% by weight of ethylene and from 0 to 5% by weight of a vinyl fatty acid.

A preferred acrylic elastomer is the one obtained by polymerizing from 80 to 100% by weight of an alkoxyalkyl acrylate and from 0 to 20% by weight of acrylonitrile. A pratically preferred acrylic elastomer is the one obtained by polymerizing from 85 to 95% by weight of an alkoxyalkyl acrylate and from 5 to 15% by weight of acrylonitrile.

The respective components of the acrylic elastomer will be described.

The alkoxyalkyl acrylate may preferably be 2-methoxymethyl acrylate, 2-ethoxymethyl acrylate, 2-methoxyethyl acrylate, 2-ethoxyethyl acrylate and 2-butoxyethyl acrylate.

Acrylonitrile is effective for improvement of the fuel oil resistance of the rubber composition. However, if it exceeds 20% by weight, the cold resistance of the composition deteriorates.

Ethylene is effective for improvement of the cold resistance of the rubber composition. However, if it exceeds 5% by weight, the fuel oil resistance deteriorates.

The vinyl fatty acid is effective for improvement of the fuel oil resistance and heat resistance of the rubber composition. However, if it exceeds 5% by weight, the cold resistance and the alcohol-added fuel oil resistance deteriorate.

The polyvinylidene fluoride resin to be used in the present invention includes polyvinylidene fluoride on a copolymer of vinylidene fluoride with other copolymerizable monomers. Such other copolymerizable monomers include hexafluoropropylene, pentafluoropropylene, trifluoroethylene, trifluorochloroethylene, tetrafluoroethylene, vinyl fluoride, perfluoro(methyl vinyl ether), perfluoro(propyl vinyl ether), other olefins and acrylic acid esters. One or more such copolymerizable monomers may be employed for the copolymerization.

The blend ratio of the acrylic elastomer and the polyvinylidene fluoride resin is 100 parts by weight of the former and from 20 to 100 parts by weight of the latter. If the polyvinylidene fluoride resin is less than 20 parts by weight, the improvement in the alcohol-added fuel oil resistance of the rubber composition will be inadequate, and if it exceeds 100 parts by weight, the cold resistance tends to be lost.

It is essential to use a peroxide for the curing of the blend, since a good cured product will not be obtained with other curing agents commonly employed for the curing of usual acrylic elastomers.

For the preparation of an acrylic elastomer, it is common to employ a method wherein a monomer curable by a certain specific curing agent is copolymerized and the curing is conducted by means of such a specific curing agent. However, such a method is not suitable for the purpose of the present invention, since the heat resistance of the cured product will thereby be inadequate. It is a feature of the acrylic elastomer of the present invention that no such curable monomer is copolymerized. The blend of the present invention can readily be cured (or cross-linked) with a peroxide, and the cured (or cross-linked) rubber composition has good heat resistance.

As the peroxide, it is possible to employ any peroxide which is commonly useful for the curing of rubber. It includes, for example, di-t-butyl peroxide, t-butylcumyl peroxide, dicumyl peroxide, α,α-bis(t-butylperoxyisopropyl)benzene, 2,5-dimethyl-2,5-di(t-butylperoxy)hexane, 2,5-dimethyl-2,5-di(t-butylperoxy)hexyne-3, 1,1-bis(t-butylperoxy)-3,3,5-trimethylcyclohexane, n-butyl-4,4-bis(t-butylperoxy)valerate, 2,2-bis(t-butylperoxy)butane and 2,2-bis(t-butylperoxy)octane. However, the peroxide is not restricted to such specific examples.

The amount of the peroxide is not particularly limited, but it is usually within a range of from 1 to 10 parts by weight relative to 100 parts by weight of the acrylic elastomer.

When the blend of an acrylic elastomer and a polyvinylidene fluoride resin is cured with the peroxide, it is effective to incorporate a polyfunctional monomer. The amount of such a polyfunctional monomer is preferably not more than 15 parts by weight relative to 100 parts by weight of the acrylic elastomer. An excessive polyfunctional monomer is undesirable, since the flexibility of the cured product tends to be thereby lost. As the polyfunctional monomer, trimethylolpropane trimethacrylate or trimethylolpropane triacrylate is most effective, and triallyl isocyanurate, triallyl cyanurate, triallyl trimellitate, 1,6-hexanediol acrylate, triethylene glycol diacrylate, polyethylene glycol diacrylate, diallyl phthalate and 1,2-polybutadiene may also be used.

For the curing with the peroxide, it is effective to combine a radical scavenger or a thiourea derivative for balancing the physical properties of the cured product. The radical scavenger used is preferably in an amount of not more than 3 parts by weight relative to 100 parts by weight of the acrylic elastomer, and the thiourea derivative used is preferably in an amount of not more than 5 parts by weight.

If the radical scavenger is used excessively, the peroxide will be consumed, such being against the intended purpose of balancing the physical properties of the cured product. Likewise, if the thiourea derivative is used excessively, the physical properties of the cross-linked product tend to deteriorate. Therefore, it is advisable to use them alone or in combination within the above-mentioned ranges.

The radical scavenger may be a compound commonly employed as a polymerization inhibitor, an antioxidant, sulfur or a sulfur-containing compound. Typical examples include phenothiazine, 2,6-di-t-butyl-p-cresol, sulfur and a sulfur compound such as a curing accelerator for rubber.

To the composition of the present invention, various additives such as a filler, a plasticizer, a processing aid and a stabilizer, which are commonly employed in the rubber industry, may be added depending upon the particular purpose of the composition.

The filler may be added prefereably in an amount of from 5 to 300 parts by weight relative to 100 parts by weight of the acrylic elastomer to improve the blend condition and the processability, whereby effective blending can be conducted. Such a filler includes, for example, carbon black, silica, calcium carbonate, clay and talc.

As the plasticizer, the one which does not impair the object of the present invention, i.e. the one having affinity to the composition, such as an oligomer of an α-olefin or polybutene, polyether or polyester, may be mentioned. The plasticizer used usually is in an amount of not more than 100 parts by weight relative to 100 parts by weight of the acrylic elastomer.

Further, to the composition of the present invention, various rubbers having excellent fuel oil resistance, may be incorporated into the composition of the present invention as the case requires.

For the preparation of the composition of the present invention, the above-mentioned materials may be kneaded at a temperature of at least the melting point of the polyvinylidene fluoride resin by a means commonly employed in the rubber industry, such as an open roll mill or an internal mixer.

According to the present invention, however, the polyvinylidene fluoride resin can be kneaded with the acrylic elastomer, optionally together with a filler, a plasticizer or other additives and a curing agent, at a temperature lower than the melting point of the polyvinylidene fluoride resin to obtain a compound stock. This method has the advantage in that the secondary processing temperature of the compound stock in order to obtain e.g. a hose is lower than when the compound stock is obtained by a usual method i.e. blending at a temperature higher than the melting point of the polyvinylidene fluoride resin.

The curing method may be any method commonly employed in the rubber industry. The curing conditions vary depending upon the type of the peroxide to be used. However, the curing can usually be accomplished by maintaining the compound stock at a temperature of from 120° to 200° C. for from 2 to 200 minutes. The curing temperature is preferably at least the melting point of the polyvinylidene fluoride resin to obtain a uniform rubber composition.

It is preferred to conduct post curing by subjecting the cured product again to heat treatment in an air oven to obtain a stabilized cured product.

The rubber composition of the present invention is excellent particularly in the gasohol resistance and also has cold resistance and heat resistance, and thus it is extremely durable as a fuel oil resistant material.

This composition is suitable as a material for various hoses to be in contact with fuel oils such as fuel oil hoses, air hoses or various hoses for control, and for various fuel oil parts such as diaphragms, packings and gaskets.

Now, the usefulness of the present invention will be described in further detail with reference to Examples. However, it should be understood that the present invention is by no means restricted by these specific Examples.

A blend was prepared by a 8 inch roll and then sheeted, and the sheet was subjected to press-curing at 170° C. for 20 minutes.

The physical properties of the cured product were measured in accordance with JIS K6301. Acrylate elastomers A and B used here were prepared as follows.

Acrylic Elastomer A

Into an autoclave, 43 kg of water, 4 kg of acrylonitrile, 36 kg of methoxyethyl acrylate, 700 g of each of Denka Poval B-05 and B-17 as polyvinyl alcohols, 60 g of sodium acetate, 2 g of ferrous sulfate, 4 g of ethylenediamine tetraacetate and 90 g of a co-catalyst were charged and mixed under stirring. The internal temperature of the autoclave was adjusted to 45° C., and the air at the above portion in the autoclave was substituted by nitrogen. From a separate inlet, an aqueous solution of a polymerization initiator was injected to initiate the polymerization, and the injection was completed in twelve hours. To the emulsion of the formed polymer, an aqueous sodium sulfate solution was added to solidify the polymer. The solidified polymer was washed with water, dehydrated and dried, and then tested as acrylic elastomer A.

Acrylic Elastomer B

Acrylic elastomer B was prepared in the same manner as the preparation of acrylic elastomer A except further adding 160 g of glycidyl methacrylate and 480 g of allyl glycidyl ether to the recipe of Acrylic elastomer A.

EXAMPLES 1 to 4 and COMPARATIVE EXAMPLES 1 to 6

300 g of acrylic elastomer A or B, and the blend components as identified in Table 1 or 2 other than the polyvinylidene fluoride resin (KYNAR #741) and the cross-linking agent, were kneaded by an 8 inch mixing roll adjusted to a roll temperature of 40° C. Then, at a roll temperature of 160° C., the polyvinylidene fluoride resin was blended thereto.

After completion of the blending, the roll temperature was lowered to 40° C., and the cross-linking agent was kneaded thereto, and the mixture was formed into a sheet having a thickness of from 2.2 to 2.4 mm.

This sheet was subjected to press-curing (cross-linking) at 170° C. for 20 minutes to obtain a cured product. In the case of the press-cured product of Comparative Example 2 or 3, the product was further exposed at 170° C. for 4 hours in a Geer oven, followed by curing to further cure the product.

The tests for the physical properties were run under normal conditions and for the heat resistance at 150° C., and 175° C. were conducted in accordance with JIS K6301.

The fuel oil resistance was determined by the volume change ($\Delta V$) after immersion in Fuel C (isooctane/toluene=50/50 by volume %) and in a mixture of Fuel C/ethanol=80/20 by volume %, at 40° C. for 70 hours.

The cold resistance was determined in such a manner that a test piece (thickness: 2 mm, length: 15 cm, width: 1.5 cm) was left to stand in a constant temperature room of $-30°$ C. for 5 hours and then bent at an angle of 180 degree whereupon the presence (X) or absence (O) of breakage was examined.

It is evident from Table 1 that the composition of the present invention has an excellent heat resistant retention of elongation as compared with the composition wherein no peroxide is employed, and it also has good cold resistance, gasoline resistance and heat resistance.

As shown by Examples 2 to 4 in Table 2, with a rubber composition of the present invention wherein a blend comprising an acrylic elastomer and a polyvinylidene fluoride resin is cured by a peroxide curing agent, the gasohol resistance is improved remarkably as the blend ratio of the polyvinylidene fluoride resin increases. However, if the proportion of the polyvinylidene fluoride resin in the blend exceeds 100 parts by weight, the physical properties of the rubber tend to be poor and as such are not suitable for a rubber composition.

TABLE 1

|  | Example | Comparative Examples | | | Comments |
|---|---|---|---|---|---|
|  | 1 | 1 | 2 | 3 |  |
| Blend |  |  |  |  |  |
| Acrylic elastomer A | 100 | 100 | — | — |  |
| Acrylic elastomer B | — | — | 100 | 100 |  |
| KYNAR #741 1) | 25 | 25 | 25 | 25 |  |
| Stearic acid | 1 | 1 | 1 | 1 |  |
| Nauguard #445 2) |  | 1 | 1 | 1 |  |
| Seast #300 3) | 50 | 50 | 50 | 50 |  |
| RS-700 4) | 25 | 25 | 25 | 25 |  |
| Curing agent |  |  |  |  |  |
| TMPT 5) | 2 |  | 2 |  |  |
| TMU 6) | 0.5 |  | 0.5 |  |  |
| Phenothiazine | 0.5 |  | 0.5 |  |  |
| V-40 7) | 8 |  | 8 |  |  |
| Accelerator DT |  | 4 |  |  |  |
| A B 8) |  |  |  | 2 |  |
| Physical properties under normal conditions |  |  |  |  |  |
| 100% Modulus (kg/cm$^2$) | 30 | This sample could not be cured. | 44 | 33 | press-curing 20 minutes at 70° C. |
| Tensile strength (kg/cm$^2$) | 76 |  | 93 | 102 |  |
| Elongation (%) | 290 |  | 210 | 320 |  |
| Hardness (JIS-A) | 63 |  | 65 | 62 |  |
| Fuel oil resistance |  |  |  |  |  |
| Fuel C $\Delta V$ (%) | 9 |  | 9 | 9 | 70 hours at 40° C. |
| Fuel C/Ethanol (80/20) $\Delta V$ (%) | 44 |  | 47 | 54 | 70 hours at 40° C. |
| Cold resistance |  |  |  |  |  |
| $-30°$ C. Bending | O |  | O | O |  |
| Heat resistance (175° C.) |  |  |  |  |  |
| Retention (%) of strength | 132 |  | 119 | 111 | Geer oven |
| Retention (%) of elongation | 83 |  | 62 | 63 | 70 hours |
| Change in hardness | +20 |  | +20 | +21 | at 175° C. |

Note:
In Comparative Examples 2 and 3, after pressing at 170° C. for 20 minutes, post curing was conducted in a Geer oven at 170° C. for 4 hours.

TABLE 2

|  | Examples | | | Comparative Examples | | | Comments |
|---|---|---|---|---|---|---|---|
|  | 2 | 3 | 4 | 4 | 5 | 6 |  |
| Blend |  |  |  |  |  |  |  |
| KYNAR #741 | 25 | 50 | 100 | 0 | 10 | 150 |  |
| Acrylic elastomer A | 100 | 100 | 100 | 100 | 100 | 100 |  |
| Stearic acid | 1 | 1 | 1 | 1 | 1 | 1 |  |
| Nauguard #445 | 1 | 1 | 1 | 1 | 1 | 1 |  |
| Seast #116 9) | 50 | 50 | 50 | 50 | 50 | 50 |  |
| RS-700 | 25 | 25 | 25 | 25 | 25 | 25 |  |

TABLE 2-continued

|  | Examples | | | Comparative Examples | | | Comments |
|---|---|---|---|---|---|---|---|
|  | 2 | 3 | 4 | 4 | 5 | 6 |  |
| Curing agent |  |  |  |  |  |  |  |
| TMPT | 2 | 2 | 2 | 2 | 2 | 2 |  |
| TMU | 0.5 | 0.5 | 0.5 | 0.5 | 0.5 | 0.5 |  |
| Phenothiazine | 0.5 | 0.5 | 0.5 | 0.5 | 0.5 | 0.5 |  |
| V-40 | 8 | 8 | 8 | 8 | 8 | 8 |  |
| Physical properties under normal conditions |  |  |  |  |  |  |  |
| 100% Modulus (kg/cm$^2$) | 42 | 77 | 108 | 15 | 23 |  | Press-curing |
| Tensile strength (kg/cm$^2$) | 85 | 111 | 127 | 81 | 80 | 133 | 30 minutes |
| Elongation (%) | 250 | 230 | 220 | 430 | 370 | 110 | at 170° C. |
| Hardness (JIS-A) | 62 | 81 | 86 | 39 | 52 | 94 |  |
| Cold deterioration resistance | −26 | −26 | −26 | −28 | −28 | −17 |  |
| (50% destruction) | ○ | ○ | ○ | ○ | ○ | X |  |
| (°C.) −30° C. Bending |  |  |  |  |  |  |  |
| Fuel oil resistance |  |  |  |  |  |  |  |
| Fuel C ΔV (%) | 10 | 7 | 1 | 20 | 15 | 0 | 70 hours at 40° C. |
| Fuel C/Ethanol (80/20) ΔV (%) | 44 | 33 | 14 | 65 | 52 | 10 | 70 hours at 40° C. |
| Heat resistance |  |  |  |  |  |  |  |
| Retention (%) of strength | 105 | 103 | 105 | 104 | 104 | 111 | Geer oven |
| Retention (%) of elongation | 84 | 80 | 86 | 81 | 82 | 73 | 70 hours |
| Change in hardness | +5 | +4 | +7 | +9 | +8 | −4 | at 150° C. |

Note:
The blend components used in the Examples and Comparative Examples were as follows:
1) Polyvinylidene fluoride, manufactured by Penwalt (50 mesh pass, melting point: 165-170° C.)
2) Naugard 445, manufactured by UniRoyal Co.
3) HAF-LS carbon black, manufactured by Tokai Carbon Co.
4) Ester plasticizer, manufactured by Adeka Argus Co.
5) Trimethylolpropane trimethacrylate
6) Trimethylthiourea
7) Perhexa V-40, peroxide, manufactured by Nippon Yushi K.K., 40% 2,5-dimethyl-2,5-di)t-butylperoxy)hexane
8) Ammonium benzoate, manufactured by Ouchi Shinko Kagaku Kogyo K.K.
9) MAF carbon black, manufactured by Tokai Carbon Co.

EXAMPLE 5

(1) Blending and compounding 1400 g of acrylic elastomer A (raw rubber) was changed into a 3 liter kneader and roughly kneaded for one minute. Then, the polyvinylidene fluoride resin (KYNAR #741, melting point 165°-170° C., 50 mesh pass) and the rest of the blend components other than the curing agent were charged thereto, and the mixture was kneaded for 3 minutes. After sweeping up the ingredients around the hopper and adding them to the mixture, the mixture was kneaded again for 3 minutes, and the blend was discharged. The blend composition and the kneading temperature are shown in Table 3.

The discharged blend was sheeted at 40° C. by a 10 inch roll. After cooling, it was again wound on a 10 inch roll and kneaded with a curing agent (peroxide), and then formed into a sheet.

(2) Extrusion

By using an extruder with L/D=400 mm/50 mm, a hose having an inner diameter of 9 mm and outer diameter of 13 mm was extruded at such a cylinder temperature as inlet/center portion/dye-mounting portion/dye head=50/70/90/110° C. at a screw rotational speed of 20 rpm.

(3) Curing

The curing was conducted under the curing conditions as shown in Table 3.

(4) Measurement of shrinkage of the extruded product

After curing by a steam autoclave under the press-curing (cross-linking) conditions as shown in Table 3, the shrinkage in the longitudinal direction of the hose (%) was measured.

(5) Physical properties

After the curing, the hose was left to stand at room temperature for one day, and then the respective physical properties were measured in accordance with JIS K6301. The results are shown in Table 3.

The solvent cracking growth and the fuel oil resistance were measured by the following methods.

(i) Solvent cracking growth:

A solvent mixture of isooctane and toluene with a volume ratio of 40:60 was maintained at 40° C., and a dumbbell No. 1 according to JIS was punched out from the sample used for the measurement of the shrinkage of the extruded product, and a cut mark was made at the center of the dumbbell in the same manner as in the De Mattia bending test according to JIS K6301. Then, by adjusting the elongation at predetermined level, it was immersed in the solvent mixture, and the time until breakage was measured.

(ii) Fuel oil resistance:

The volume change (ΔV) after immersion in Fuel C (isooctane/toluene=50/50 by volume %) and in a mixture of fuel C/ehtanol=80/20 by volume %, at 40° C. for 70 hours, was measured.

TABLE 3

| Blend | Example 5 |
|---|---|
| Acrylic elastomer A | 100 |
| KYNAR #741 (Melting point: 165-170° C.) | 50 |
| Stearic acid | 1 |
| Nauguard #455 | 1 |
| Seast #6 10) | 25 |
| Asahi thermal 11) | 35 |
| RS-107 12) | 15 |

TABLE 3-continued

|  | Example 5 |
|---|---|
| HV-100 13) | 10 |
| TMPT | 2 |
| TMU | 0.5 |
| Phenothiazine | 0.5 |
| V-40 | 8 |
| Kneading | |
| Kneader temperature (°C.) | 40 |
| Curing condition | |
| Temperature (°C.) | 170 |
| Time (min.) | 30 |
| Physical properties of cured product | |
| 100% Modulus (kg/cm$^2$) | 51 |
| Tensile strength (kg/cm$^2$) | 110 |
| Elongation (%) | 390 |
| Hardness (JIS-A) | 77 |
| Solvent cracking growth | |
| Elongation | |
| 50% (h) | 0.2 |
| 40% (h) | >24 |
| Fuel oil resistance | |
| Fuel C resistance ΔV (%) | 19 |
| Fuel C/EtOH resistance ΔV (%) | 41 |
| Shrinkage of the hose (%) | 7 |

Note:
Blend components other than mentioned above:
10) ISAF carbon black, manufactured by Tokai Carbon Co.
11) FT carbon black, manufactured by Asahi Carbon Co.
12) Ester platicizer, manufactured by Adeka Argus Co.
13) Polybutone, manufactured by Nippon Sekiyu Kagaku K.K.

We claim:

1. A rubber composition obtained by curing with a peroxide a blend consisting of 100 parts by weight of an acrylic elastomer and from 20 to 100 parts by weight of a polyvinylidene fluoride resin relative to 100 parts by weight of the acrylic elastomer, wherein the acrylic elastomer comprises from 80 to 100% by weight of an alkoxyalkyl acrylate, from 0 to 20% by weight of acrylonitrile, from 0 to 5% by weight of a vinyl fatty acid.

2. The rubber composition according to claim 1, wherein the acrylic elastomer comprises from 85 to 95% by weight of an alkoxyalkyl acrylate and from 5 to 15% by weight of acrylonitrile.

3. The rubber composition according to claim 1, wherein the alkoxyalkyl acrylate is 2-methoxymethyl acrylate, 2-ethoxymethyl acrylate, 2-methoxyethyl acrylate, 2-ethoxyethyl acrylate or 2-butoxyethyl acrylate.

4. The rubber composition according to claim 1, wherein the polyvinylidene fluoride resin is a homopolymer of vinylidene fluoride or a copolymer of vinylidene fluoride with other copolymerizable monomer selected from the group consisting of hexafluoropropylene, pentafluoropropylene trifluoroethylene, trifluorchloroethylene, tetrafluoroethylene, vinyl fluoride, perfluoro (methyl vinyl ether), perfluoro(propyl vinyl ether), other olefins and acrylic acid esters.

5. The rubber composition according to claim 1, wherein the blend is cured with from 1 to 10 parts by weight of the peroxide relative to 100 parts by weight of the acrylic elastomer.

6. A rubber composition consisting of a blend obtained by curing with a peroxide 100 parts by weight of an acrylic elastomer, from 20 to 100 parts by weight of a polyvinylidene fluoride resin relative to 100 parts by weight of the acrylic elastomer from 5 to 300 parts by weight of an inorganic filler relative to 100 parts by weight of the acrylic elastomer, and fro m0 to 100 parts by weight of a plasticizer relative to 100 parts by weight of the acrylic elastomer, wherein the acrylic elastomer comprises from 80 to 100% by weight of an alkoxyalkyl acrylate, from 0 to 20% by weight of acrylonitrile, from 0 to 5% by weight of ethylene and from 0 to 5% by weight of a vinyl fatty acid.

7. A process for producing a rubber composition of claim 1, which comprises preparing a compound storck consisting of the blend consisting of 100 parts by weight of an acrylic elastomer and from 20 to 100 parts by weight of a polyvinylidene fluoride resin relative to 100 parts of the acrylic elastomer, wherein the acrylic elastomer comprises from 80 to 100% by weight of an alkoxyalkyl acrylate, from 0 to 20% by weight of acrylonitrile, from 0 to 5% by weight of ethylene and frmo 0 to 5% by weight of a vinyl fatty acid and the peroxide at a temperature lower than the melting point of the polyvinylidene fluoride resin and curing the blend with the peroxide at a temperature of at least the melting point of the polyvinylidene fluoride resin.

8. The rubber composition according to claim 7, which is formed into a hose, a diaphragm, a packing or a gasket to be in contact with a fuel oil.

* * * * *